US010674094B2

(12) United States Patent
Wharton (10) Patent No.: US 10,674,094 B2
(45) Date of Patent: Jun. 2, 2020

(54) INFINITE VIRTUAL PAN TILT ZOOM CAMERA

(71) Applicant: SKYCAM, LLC, Fort Worth, TX (US)

(72) Inventor: Stephen Wharton, Weatherford, TX (US)

(73) Assignee: SKYCAM, LLC, Fort Worth, TX (US)

( * ) Notice: Subject to any disclaimer, the term of this patent is extended or adjusted under 35 U.S.C. 154(b) by 0 days.

(21) Appl. No.: 16/011,515

(22) Filed: Jun. 18, 2018

(65) Prior Publication Data

US 2019/0068897 A1 Feb. 28, 2019

Related U.S. Application Data

(60) Provisional application No. 62/521,026, filed on Jun. 16, 2017.

(51) Int. Cl.
| | |
|---|---|
| *H04N 5/262* | (2006.01) |
| *H04N 5/247* | (2006.01) |
| *H04N 5/232* | (2006.01) |
| *G06K 19/07* | (2006.01) |
| *G01S 13/87* | (2006.01) |
| *G01S 13/75* | (2006.01) |
| *G06T 3/00* | (2006.01) |

(52) U.S. Cl.
CPC ....... *H04N 5/2628* (2013.01); *G06K 19/0723* (2013.01); *H04N 5/23238* (2013.01); *H04N 5/23299* (2018.08); *H04N 5/247* (2013.01); *G01S 13/751* (2013.01); *G01S 13/878* (2013.01); *G06T 3/0062* (2013.01)

(58) Field of Classification Search
None
See application file for complete search history.

(56) References Cited

U.S. PATENT DOCUMENTS

| | | | | |
|---|---|---|---|---|
| 8,527,340 | B2* | 9/2013 | Fisher | G06Q 30/02 |
| | | | | 705/14.4 |
| 2013/0051805 | A1* | 2/2013 | Wharton | H04J 14/02 |
| | | | | 398/96 |
| 2014/0313339 | A1* | 10/2014 | Diessner | H04N 7/18 |
| | | | | 348/148 |
| 2016/0101358 | A1* | 4/2016 | Ibrahim | A63F 13/42 |
| | | | | 463/33 |
| 2016/0280136 | A1* | 9/2016 | Besson | B60R 1/00 |
| 2017/0074652 | A1* | 3/2017 | Send | G01J 3/513 |
| 2017/0148223 | A1* | 5/2017 | Holzer | G06T 3/4038 |

* cited by examiner

*Primary Examiner* — Christopher Braniff
(74) *Attorney, Agent, or Firm* — Schroeder Intellectual Property Law Group, LLC (57) ABSTRACT

A system and method for generating an infinite number of isolated image sequences using a single camera, wherein an X-, Y-coordinate system is generated for the area and an image sequence within the field of view of a camera within the area is captured. By tracking the movements and positions of at least two assets in the field of view of the camera relative to the X-, Y-grid, at least one individual image sequence for each of the at least two assets using the image sequence captured by the camera, wherein each individual image sequence has one asset from the at least two assets as a focal point of the individual image sequence.

12 Claims, 4 Drawing Sheets

INFINITE VIRTUAL PAN TILT ZOOM CAMERA

RELATED APPLICATIONS

This application claims priority to U.S. Provisional Application Ser. No. 62/521,026 filed on Jun. 16, 2017, the contents of which are fully incorporated herein by reference.

FIELD OF THE INVENTION

The present invention is directed to a system and method utilizing an image sequence generated by a single camera to create an infinite number of image sequences, all having a different focal point.

BACKGROUND OF THE INVENTION

In order to create multiple videos or image sequences with different locations, bodies or elements as the focal point, multiple cameras have to be used. While wide-angle cameras can capture a panoramic view of an area or location and potentially capture more locations, bodies or elements within its field of view, these cameras generally have a focal point somewhere in the middle of the viewing angle of the lens. In order to generate image sequences or videos having different focal points within the area captured, even when using cameras with a wide-angle lens, multiple cameras are still required.

Location sensors or individual identification ("ID") tags may be used to track or gather data on locations, bodies or elements, including locations, bodies or elements within an area. For example, radio-frequency identification chips or tags ("RFID tags") may be applied to individual bodies so that those individual bodies are capable of having their movement and locations tracked within a given area. Any tracking may be relative to a specific location or position so that the position of the RFID tag, for example, is known within the area relative to the fixed position.

It would be beneficial to use the combined elements of a camera, and in particular a wide-angle camera, with existing tracking technology to create images or video which can be processed to generate an infinite number of individualized videos or image sequences each having a different focal point from a single master image sequence shot by a camera.

The present invention aims to provide such a system and method.

SUMMARY OF THE INVENTION

The present invention is directed to a system and method of utilizing a single camera to capture image sequences having multiple assets within the field of view of the lens of the camera, and using the captured image sequence to develop an individual image sequence for all desired assets within the overall or master captured image sequence. Each individual image sequence has one desired asset as the focal point of the individual image sequence. In order to create the individual image sequences, an area captured in the image sequences captured by the camera is mapped and individual asset tracking is used so that the video can be processed with the tracking information for each individual tracked asset relative to the captured area. By mapping the area within the field of view of the camera lens and tracking the position of each individual asset therein, a single image sequence can be processed to produce an infinite number of individual image sequences focusing on each asset tracked within the field of view. Essentially, an infinite number of individual image sequences each having a different focal point can be generated from a single master image sequence.

According to one aspect of the invention, a method of generating an infinite number of isolated image sequences using a single camera is provided. In order to generate the infinite number of isolated image sequences, an area to be captured is mapped and an X-, Y-coordinate system, a grid or other coordinate system for the area is generated and applied to the area as captured and processed by a computer or other video processing system. Image sequences occurring within the field of view of a lens of the camera are captured by the camera to be broadcasted, recorded or otherwise stored. While broadcasting, recording or otherwise storing the image sequences within the field of view of the camera lens, the movements and positions of at least two assets in the field of view of the lens are tracked and recorded relative to the X-, Y-coordinate system of the area. Utilizing the captured image sequence(s), the X-, Y-coordinate system applied to the area, and the tracking of individual assets, at least one individual image sequence can be created by computer or other video processing device for each of the at least two assets, wherein each individual image sequence has one asset from the at least two assets as a focal point of the individual image sequence. The image sequence captured by the camera may be, for example, video or a live action stream captured by the camera.

The camera utilized in the system may be a fixed camera, for example fixed on a tripod or a pedestal, or may be a movable camera carried by an individual, set on dolly, cart or other movable element, or may be aerially moved by an aerially moved camera system, like for example those described in U.S. Pat. Nos. 6,809,495; 6,873,355; 6,975,089; 7,088,071; 7,127,998; 7,239,106; 9,063,390; 9,337,949; and 9,477,141, and U.S. Pat. Pub. Nos. 2011/0204197 and 2013/0050467, the contents of all of which are expressly incorporated herein by reference in their entirety. For example, the camera may be suspended over the area using an aerially moved payload comprising a plurality of line, reel and motor combinations which are used to move the camera about the area using the aerially moved payload system. As the camera moves, at least two assets may remain in the field of view of the lens of the camera.

While any type of camera can be utilized and processed in order to create an infinite number of independent image sequences from a single master image sequence, in order to capture the largest number of assets at one time and largest area within the field of view of the lens, the lens may be a wide-angle lens capable of capturing panoramic image sequences and video. A wide-angle lens may have a field of view of at least 180°, for example, or may have a field of view of 360°. When using a hemispherical camera, a camera with a 180° lens, a camera 360° lens, or other wide-angle camera, portions of the master image sequence or video may be warped. In order to correct this, after generating each individual image sequence, the individual image sequences or videos may be de-warped in order to create a flat, easier to view image sequence with the asset forming the focal point in that particular image sequence. It may also be beneficial to use high-density cameras, a 4K camera, or any other camera having a high resolution. Utilizing high-density, 4K or other high-resolution cameras allows for the individual image sequences to be zoomed, enlarged and enhanced to a greater degree after being generated from the master image sequence.

Each individual image sequence or video may also be indexed to reflect each individual asset tracked in the sequence, as well as to reflect any number of other selected, marked and tracked parameters related to the master image sequence. The indexed individual image sequences may be stored in a database, on a digital video recorder ("DVR") or other storage device, wherein each individual image sequence is indexed with the asset corresponding to the focal point of the individual image sequence, and may be searchable in the memory of the storage device by asset or any other tracked and selected parameter related to the image sequences.

Multiple master image sequences from one or multiple cameras can be stored in the database, DVR or other storage device, wherein image sequences include each individual image sequence generated by the master image sequences. The collection of individual image sequences or videos with specific assets as the focal points can be indexed based on the asset captured in each individual sequence, wherein individual image sequences of a single asset captured by multiple cameras are indexed and compiled into a single individual image sequence.

Each individual image sequence may be coded so as to be searchable based on not only on the asset captured, but also by searching selected and/or indexed parameters within each individual image sequence. Multiple individual image sequences within the database, DVR or stored any other storage device can be produced and viewed together based upon at least one selected parameter.

Other advantages and aspects of the present invention will become apparent upon reading the following description of the drawings and detailed description of the invention.

DETAILED DESCRIPTION OF THE PRESENT INVENTION

While this invention is susceptible to embodiments in many different forms, there is described in detail herein, preferred embodiments of the invention with the understanding that the present disclosures are to be considered as exemplifications of the principles of the invention and are not intended to limit the broad aspects of the invention to the embodiments illustrated.

The present invention is directed towards a camera system and method of controlling and producing an image sequence captured by a camera system, wherein a single camera can be used in conjunction with a mapped or coordinated area, and asset tracking, to generate an infinite number of individual image sequences with different assets set as the focal point using a single master image sequence capturing assets within the mapped or coordinated area. As used herein, the term image sequence means any sequence of images captured by a camera, including but not limited to a series of still images, video, standard or high-definition images, infrared images, thermal images, and night vision images. The term camera means any type of known camera, including but not limited to wide-angle lens cameras such as hemispherical cameras, 180° lens cameras and 360° lens cameras, as well as high-density, 4K, high resolution or other high-density cameras. The term asset refers to any item, body or location of interest within the mapped area. Assets may include but are not limited to people or individuals within the area, particular items within the area, boundaries of the area, or locations within the area. Areas refer to any area which may be mapped by a computer and filmed or captured by a camera, including but not limited to sports or athletic fields, arenas or areas with crowds, sets or other locations or areas being filmed relative to movies or television or the like.

Figure 1:
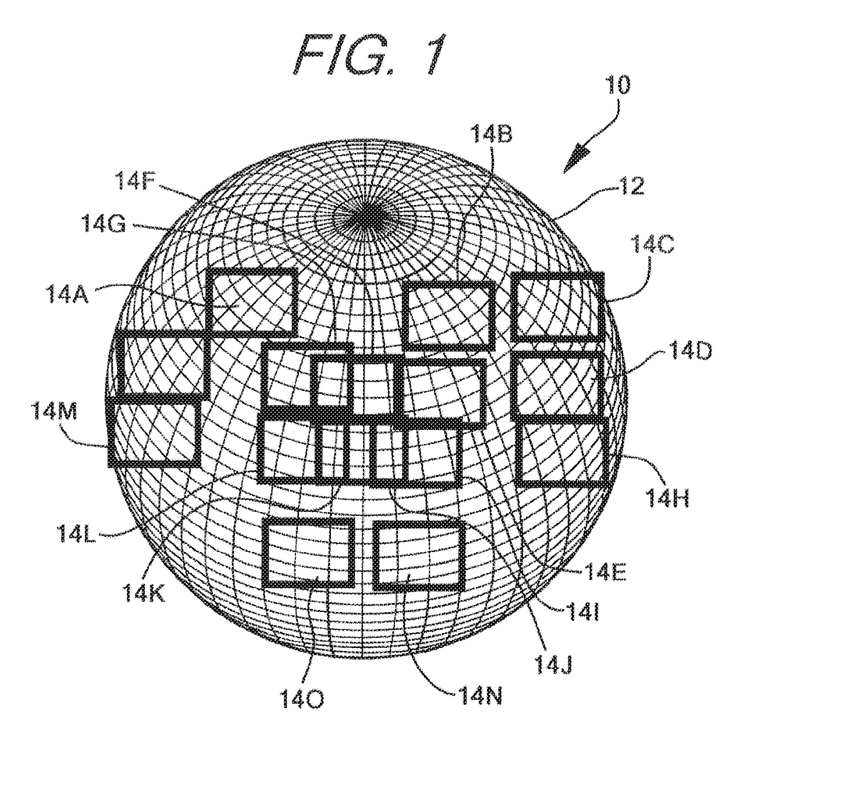
FIG. 1 shows a generic wide-angle view of a mapped area and assets located therein.

In order to utilize a single camera to create an infinite number of individual image sequences, the area must be captured and mapped with a grid or coordinate system with the area grid or coordinate system being set within a computer or database in which the captured image sequences will be stored and processed. A general mapped area can be seen in FIG. 1, for example. As seen in FIG. 1, mapped area 10 has grid or coordinate system 12 interposed thereon. Rather than be a grid as shown in FIG. 1, for example, the grid or coordinate system may take the form of an X-, Y-coordinate system which is generated in all directions from a selected origin point within the area and extending to any area boundaries configured within the computer or database as seen and described further with respect to FIG. 3. In embodiments where a static camera which is not configured to move is utilized to capture image sequences from the area, such as camera 106 in FIG. 2, the origin point may be set at the camera or at a point proximate the camera with the coordinates extending therefrom. Where the camera is configured to move about the area, like for example when an aerial camera system is used to a camera like camera 104 in FIG. 2, an origin point 122 (see FIG. 3) must be set somewhere within the area and movement of the camera relative to the coordinate system should tracked so that the position of the camera relative to the area and grid or coordinate system generated for the area is known at all times within the computer and/or database processing and storing the captured images as the camera captures image sequences in the area.

For cameras which are to move about the area, tracking devices like those used herein with respect to assets, may be used to track the movements and position of the cameras relative to the area and grid or coordinate system. In order to track movement of the camera within any grid or coordinate system generated for the area, it should be understood that where a moving camera is used and has its position tracked relative to the area, it is beneficial if the camera remains within the mapped area so that the location can be pinpointed within the area for generating individual image sequences as discussed herein. While a master image sequence may be captured and individual images generated by a camera which has moved outside the mapped area, the accuracy and focal points of such images may be less accurate than cameras which move within the mapped area and have a location known by the system within the area at substantially all times.

The coordinate system or grid system utilized to map an area to be captured, may take any form and may be completely generated by a computer or other video or image processing device which receives and processes images captured from the area, or may be generated based at least in part on characteristics, locations or markings located within the area. For example, the grid or coordinate system may be generated in whole or in part to reflect certain markings on a sports field or items within the area captured. The grid or coordinate system may be scaled to any desired scale within the computer or other processing device receiving and processing the images. The scale may be set as large or as small as needed, with the size of the assets, the size of the area and any requirements for accuracy in capturing the assets and generating the individual image sequences being used to help determine scale size of the grid or coordinate system.

Once the area is mapped and coordinates set, and the camera placed at or within the area, any cameras and assets which are to be tracked can be tagged for tracking within the coordinate system within the area to be captured by the camera. As seen in FIG. 1, a large number of assets 14A-14O may be tracked within the area. Indeed, it should be understood that any number of assets may be positioned and tracked within an area, with any number of individual image sequences being generated for those assets. Examples of tracking systems or devices which can be used by the computer to track the position and movements of assets relative to the area and/or camera include but are not limited to radio-frequency identification ("RFID") tags, infrared ("IR") tracking, GPS tracking, local positioning tracking systems, optical tracking, or a combination of these or any other tracking solutions capable of being used to track an asset's location within a coordinate system. Utilizing tracking elements as discussed capable of having unique identification like an RFID tag will allow for more accurate and easier tracking of specific individual assets within the area, and consequently make processing captured image sequences focused on the specific individual assets easier. Within FIG. 1, for example, each asset 14A-14O may have an individual image sequence created showing the area indicated on the grid with the asset itself forming the middle of the image. As discussed herein, using tracking systems with unique identification also allows for individual image sequences to be more easily indexed, searched and reviewed when stored in a computer database, digital video recorder ("DVR") or other memory storage device.

For assets which are fixed (see for example Asset C in FIGS. 4 and 7 discussed herein), tracking will allow for an individual image sequence to be generated focusing on that asset at that location based on the computer's knowledge of the location of the asset. For example, a goal line or boundary line on a sporting surface having a fixed location on the coordinate system enables the computer to generate an individual image sequence with the goal line or a portion of the goal line as the focal point of the individual image sequence. Any fixed object within the area can be tagged so that the computer can process an individual image sequence with the object as the focal point so long as it remains within the field of view of the camera and camera lens, regardless of where the camera moves as the coordinate location of the object and the coordinate location of the camera is known to the computer.

For assets which move, the movements of the objects are tracked by the computer relative to the coordinate system established for the area being captured. As an individual, for example, moves through area, an RFID tag or other tracking element positioned with the user may continuously have its location tracked about the area by sensors or communication elements positioned at known locations within the mapped area. If the sensors or any communication points for the RFID tags are set are set at known X-, Y-coordinates within the mapped area, the signals received from the RFID or other location sensing tags can be used to determine the location of the RFID or other location sensing tag, with the coordinates then being provided to the computer processing the image sequence to generate a movement history for the asset associated with the tag within the area. Synching the movement history of the asset and its associated RFID tag with the master image sequence will allow the computer or other video processor to create the individual image sequence with the coordinates of the RFID tag and the associated asset as the focal point. The computer or other video processor can adjust the master image sequence to focus on the X-, Y-coordinates of the RFID tag as it moves about the area. With the known movement coordinates being synched with the time of the image sequence, the individual image sequence with the asset as the focal point becomes realized. The individual image sequence may then be adjusted so that the asset is, for example enlarged or enhanced in the individual image sequence. Utilizing high-density, 4k, high resolution or other high definition cameras allow for more "zooming" by the processing computer or image processor as the higher the pixel count in the image, the more the individual image sequence can be "zoomed" in on the asset without creating gaps within or distorting the individual image sequence. This process can be repeated for each tracked asset within the area for an entire master image sequence to generate any number of individual image sequences.

Local area positioning can be used in much the same way. With a local area positioning system multiple fixed registration points can be placed about the area at known coordinates, with each asset being fitted with a transceiver in communication with the fixed registration points. By communicating with each transceiver, the fixed registration points and an associated computer can track, store and map the X-, Y-coordinates of assets as they move about the area. When synched with the master image sequence, an infinite number of individual image sequences can be generated, one for each asset with the associated asset being the focal point of the individual image sequence. Local area positioning systems may be particularly beneficial when used with aerially moved camera systems which use a local area positioning system to calibrate movement of the camera, such as that described in U.S. Pat. Pub. No. 2011/0204197 which is fully incorporated herein by reference. In such systems, the known, fixed registration points can be utilized to both calibrate the movement of the camera and track movements of assets within the area, provide for tracking of the camera location within the area, or eliminate the need for the tracking of the camera as the camera's movement may be calibrated to match the grid or X-, Y-coordinate system prior to use so that movement of the camera is known by the computer or video processing element without having to track the camera movement any further.

Using the tracked asset movement within the mapped area and the known location(s) of the camera or tracked movement of the camera within the mapped area, a computer receiving the captured master image sequence from the camera can utilize the asset tracking and camera position when the image sequence was captured to generate an infinite number of individual image sequences, one or more each focusing on each captured asset within the mapped area in the field of view of the camera and camera lens. By knowing the coordinate location of the camera within the mapped area, the computer can take the image sequence captured by the camera and generate an individual image sequence with a first asset as the focal point by focusing the individual image sequence on the coordinates within the area on the tracked movement of the first asset. Using the same image sequence, and again knowing the coordinate location of the camera within the mapped area, the computer can take the same image sequence captured by the camera and generate a second individual image sequence with a second asset as the focal point by focusing the second individual image sequence on the coordinates within the area. This process can be repeated for all tracked assets, fixed or moving, within the area and field of vision of the camera to generate an infinite number of individual image sequences using the single image sequence by placing the focal point of each individual image sequence at the tracked coordinates of each individual asset. A single camera can be used, for example, to generate an individual image sequence or video for each individual athlete on a playing surface at a given time, or to generate an individual video of focused on all individuals within a filmed given area, or to generate individual images focused on mapped points within a given area, like for example some or all seat locations in an arena.

In systems where a hemispherical, 180° or 360° camera is used, once the individual image sequences are generated, each individual image system may be de-warped in order to create a flat, easier to view individual image sequence of each asset, regardless of the asset's location within the field of view of the camera. As mentioned above, regardless of the type of camera, each individual image sequence may be zoomed, enlarged or enhanced to increase the size of the asset forming the focal point.

Once each individual image sequence is generated, the individual image sequences can be stored and searched by asset, for example, within a database, DVR or other storage device utilized to store the individual images. In addition to tracking individual assets and providing a database or other storage medium searchable by asset, each individual image sequence may be indexed and searchable based on any other search parameters marked within the master or any individual image sequence. If all desired parameters are tracked when generating the master image sequence used to generate individual image sequences, the tracking information may be carried over into each individual image sequence when each individual image sequence is generated.

Searching may be accomplished through direct use of the computer processing the images and any associated storage devices used to store the individual image sequences. Being stored in a database, on a DVR or other storage device also allows for remote access to the master image sequence and/or any individual image sequences so long as the user has a computer or image viewing device connected to and authorized to view the image sequences on the database, DVR or other storage device. For example, production crews or other individuals on site at a location may be able to view and utilize the individual image sequences, as well as individuals offsite, such as league officials for replay or fans at home watching a game. Inasmuch as the master image sequence and any associated individual sequences are recorded and stored, the master and individual image sequences can be replayed, searched, and reviewed off site after being captured so long as an individual has access to and authorization to view a database, DVR or other storage medium having the master and individual image sequences stored thereon.

Examples of search parameters or indexing which may be used in the master image sequence and/or any individual image sequences which may be searchable include, but are not limited to: real-time of when the image sequence was captured; a local time based on the starting of the image sequence or some other time related to the image sequence capture; a game time or time on a clock at an event; a date or other time indication; a specific period or portion of a captured sequence event like for example a quarter, period or half; a sequence or series of sequences within a captured sequence; data related to a portion of a capture image sequence; and specific events or dialogue which occurs within a captured image sequence, like for example a specific play or series of plays in an event or a specific line of dialogue given in a speech. Indexing can be accomplished for a specific a time in a game for example, or specific events like scoring plays or a specific sequence of events like each occurrence of a particular down in American Football.

Utilizing a database, DVR or other storage device, multiple image sequences and master image sequences from multiple cameras can be stored on a single device, along with all individual image sequences generated from each master image sequence. The individual image sequences can then be stored, searched, indexed and processed together using the various search parameters so that each individual image sequence can be laced together, as desired, to form a combined individual image sequence combining all or parts of multiple individual image sequences together. For example, if each individual image sequence is indexed for local clock time, and for various periods or portions of an event, the individual image sequence of a single asset for the same period or time across different image sequences can be interlaced and viewed together. As an example, a combined image sequence may be generated from the last five minutes of the fourth quarter for all games played by a particular athlete in a sport. The combined image sequence would include each portion of each individual image sequence for the asset, in this case the player, which match the search parameters entered into the computer and any associated storage device for playback, in this case the last five minutes of the fourth quarter of all games.

Rather than have a single asset combined image sequence, the combined image sequence can be processed to combine any number of individual sequences for any entered search parameters. Similarly, any computer used for playback and any storage medium may be accessed to view multiple combined videos at once, and as long as each individual image sequence is indexed for the desired search parameters. Within a sports environment, combined individual image sequences can be generated for multiple players on a field for a particular time, play, sequence or event.

Figure 2:
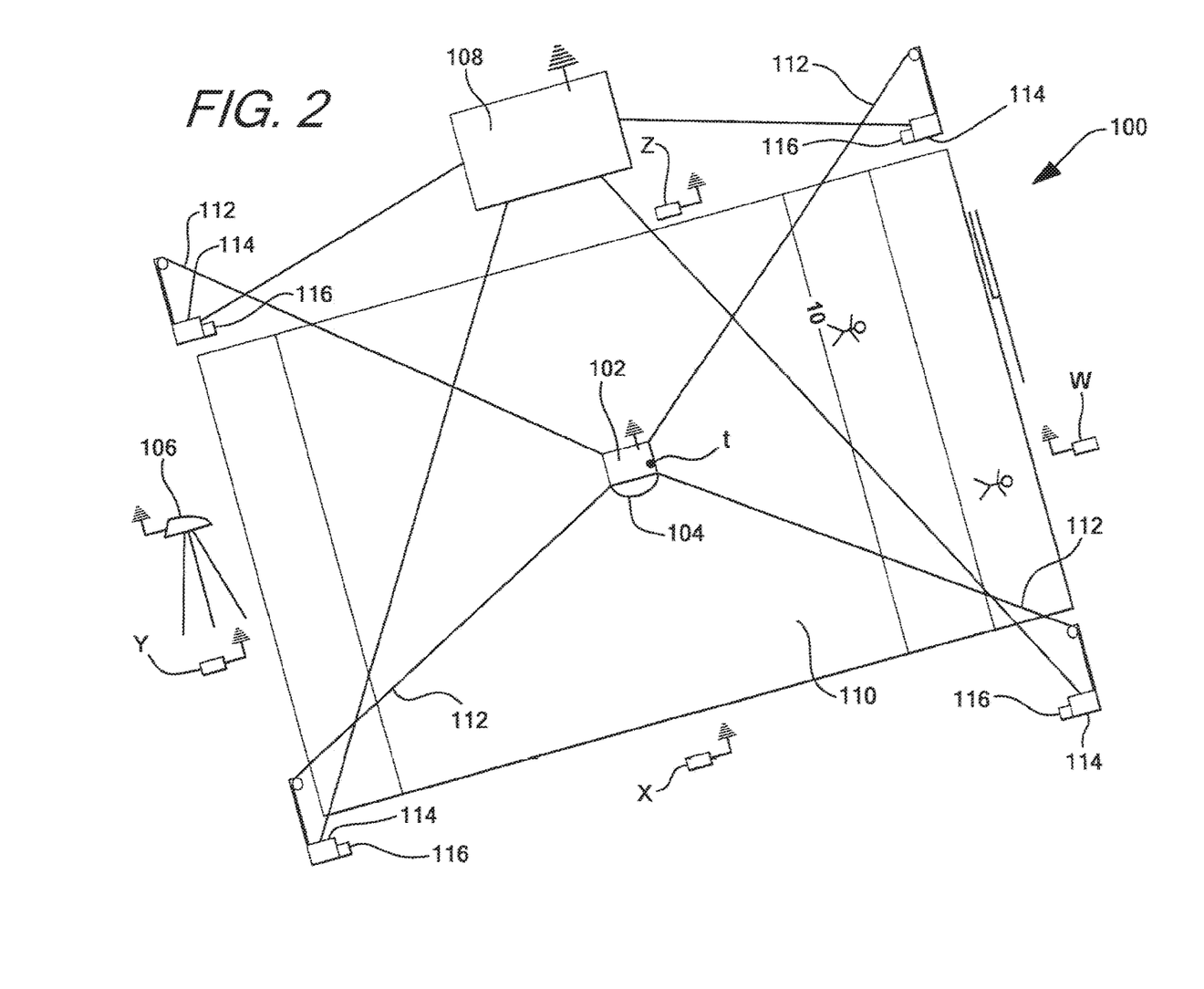
FIG. 2 shows an area captured by a camera system and assets being captured within the area by the camera system.

A system for the present invention using an aerially moved camera system can be seen in FIG. 2. As seen in FIG. 2, a system 100 for aerially moving a payload 102 may include a wide-angle camera 104, which may be high-density, 4K, high resolution or high-definition and may be a 360°, 180° or hemispherical camera, for example. The system may include additionally or alternatively include wide-angle camera 106, separate and apart from the payload 102, which matches or is different than camera 104. As taught in the aforementioned patents, data, which may include images, may be transmitted from payload 102 to control center 108 for processing, broadcasting, recording, capturing, storing or the like. Control center 108 may include, for example, elements for image, sound and/or data processing, manipulating, modifying, generating and/or recording; broadcasting or data transmission elements; control elements for maneuvering and controlling payload 102; elements for mapping and storing the mapping of an area over which the payload traverses; and elements for tracking the location of assets relative to the payload and area over which the payload is traversing. A single element, like a computer, or multiple computers, and/or any other elements capable of digital image processing and production may be utilized to perform some or all of these actions. One computer may, for example process the images while a second computer is used by a pilot to maneuver the aerially moved payload and camera about the area.

In order to maneuver the payload over area 110, for example, system 100 may include lines 112 which are controlled by reels 114 and motors 116 to move the payload over the area. Motors 116 and reels 114 may be controlled by control center 108 where a pilot or user maneuvers payload 102 over area 110 using a computer and a joystick or other control element. The pilot may for example maneuver the payload around the area utilizing the joystick or other control element, with each motor and reel extending or retracting its respective line in response to the control signal being received from the joystick or other control element.

Any image sequences and/or video captured by wide-angle camera 104 may, along with any other data captured by elements on payload 102, be transmitted back to control center 108 using embedded data transmission lines (i.e. coaxial or fiber optic cables.) embedded in lines 112, or by using wireless data transmission, or by some combination of the two.

Where wide-angle camera 106 is used in addition to or in place of wide angle camera 104 in system 100, similar control signals and image transmission elements can be employed.

An example of an image sequence processed using the present method and system can be seen in FIGS. 3-7.

Figures 3, 4:
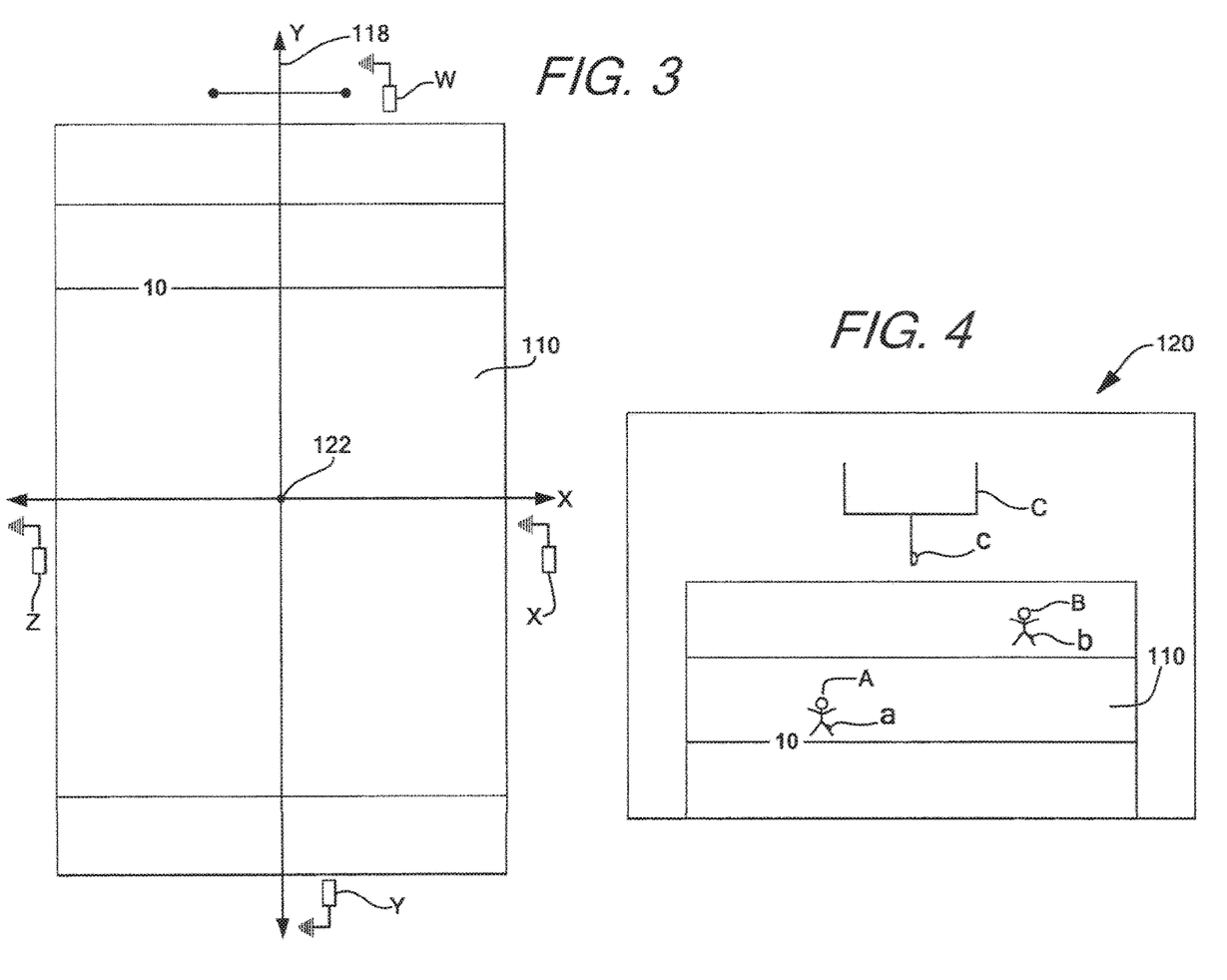
FIG. 3 show the area of FIG. 2 as mapped by a system computer.
FIG. 4 shows an exemplary master image sequence as captured using the system in FIG. 2.

FIG. 3 shows area 110 from FIG. 2 having coordinate system 118 applied thereto by a computer or other video processing device at control center 108. Mapping of the area preferably occurs prior to the capturing of any image sequences with assets thereon.

Figure 5:
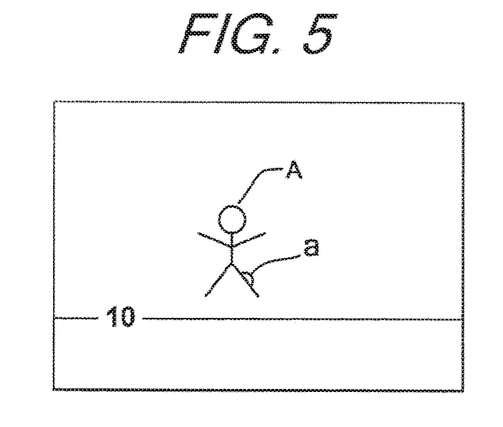
FIG. 5 shows an exemplary individual image sequence generated with asset A from FIG. 4 as the focal point.
Figure 6:
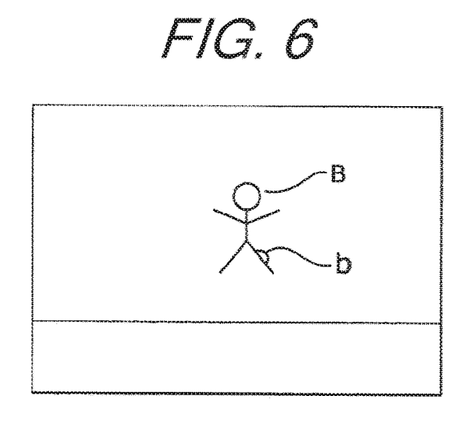
FIG. 6 shows an exemplary individual image sequence generated with asset B from FIG. 4 as the focal point.
Figure 7:
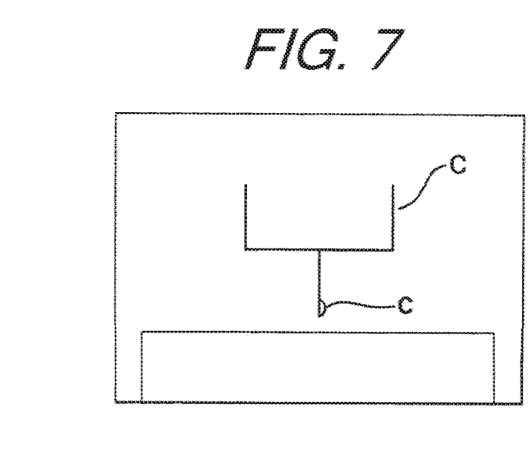
FIG. 7 shows an exemplary individual image sequence generated with asset C from FIG. 4 as the focal point.

FIG. 4 shows a master image sequence as captured by camera 104 in FIG. 2. Within master image sequence 120 are assets A, B and C, each having a tracking device a, b and c respectively which are in communication with sensors or communication points w, x, y and z. Sensors or communication points w, x, y and z area all in communication with control center 108 and any computer located therein. Utilizing the method and system discussed herein, a computer or other video processing device at control center 108 can process master image 120 to generate individual image sequences for each of assets A, B and C as shown in FIGS. 5-7 respectively.

Utilizing coordinate system 118 set for area 110 by the computer or video processing device at control center 108, the computer or video processing device can process master image sequence 120 to focus on any given point within the coordinate system within area 110. Through tracking the position of camera 104 using tracker t, and all assets, like for example Assets A, B and C using trackers a, b and c respectively using sensors or communication points w, x, y and z, the computer or image processing device can synch the tracked position of the camera and the tracked position of each asset to generate the individual image sequences for each tracked asset by knowing where within the area on the coordinate system the camera is, and where within the coordinate system to adjust the master image sequence to make the focal point of the master image sequence each tracked asset.

An individual image sequence for Asset A, for example, can be generated through the recorded tracking of the asset using the coordinates provided by or detected from tracker a by one or more of sensors or communication points w, x, y and z as Asset A moves about the area. Utilizing the tracked coordinates of tracker a, the computer or other image processing device can create the individual image sequence from the master sequence by creating an image sequence which maintains the focal point of the image on the coordinates of tracker a. In order to provide a clearer image, the computer or other image processing device can be used to de-warp and zoom in on Asset A once the individual image sequence is generated. This process can be done for Assets B and C, as well as any others tracked within the area, in order to generate an infinite number of individual image sequences.

While in the foregoing there has been set forth preferred embodiments of the invention, it is to be understood that the present invention may be embodied in other specific forms without departing from the spirit or central characteristics thereof. The present embodiments, therefore, are to be considered in all respects as illustrative and not restrictive, and the invention is not to be limited to the details given herein. While specific embodiments have been illustrated and described, numerous modifications come to mind without significantly departing from the characteristics of the invention and the scope of protection is only limited by the scope of the accompanying claims.

What is claimed is:

1. A method of generating an infinite number of isolated image sequences using a single camera, the method comprising the steps of:
   generating an X-, Y-coordinate grid for an area;
   capturing an image sequence within the field of view of a camera within the area;
   tracking movements and positions of at least two assets in the field of view of the camera relative to the X-, Y-grid;
   creating at least one individual image sequence for each of the at least two assets using the image sequence capture by the camera, wherein each individual image sequence has one asset from the at least two assets as a focal point of the individual image sequence;
   storing each individual image sequence in a storage medium, wherein each individual image sequence is indexed with the asset corresponding to the focus of the individual image sequence;
   storing image sequences of multiple cameras in the storage medium, wherein image sequences include each individual image sequence captured by each camera; and
   indexing each individual image sequence based on the asset captured in each individual sequence, wherein individual image sequences of a single asset captured by multiple cameras are indexed and compiled into a single individual image sequence.

2. The method of claim 1 wherein the image sequence is a video.

3. The method of claim 1 further comprising the steps of suspending the camera over the area using an aerially moved payload comprising a plurality of lines, reel and motor combinations; and
   moving the camera about the area using the aerially moved payload system, wherein each of the at least two assets remain in the field of view of the camera as the camera is moved about the area.

4. The method of claim 1 wherein the camera has a wide-angle lens.

5. The method of claim 4 wherein the wide-angle lens has a field of view of at least 180°.

6. The method of claim 4 wherein the wide-angle lens has a field of view of 360°.

7. The method of claim 4 further comprising the step of dewarping each individual image sequence.

8. The method of claim 1 wherein the camera is one from the group consisting of: a high-resolution camera or a 4K camera.

9. The method of claim 1 further comprising the step of coding each individual image sequence, wherein each individual image sequence is coded so as to be searchable based on selected parameters.

10. The method of claim 9 wherein multiple individual image sequences can be produced together based upon at least one selected parameter.

11. The method of claim 1 wherein at least one of the at least two assets is an individual.

12. The method of claim 1 wherein at least one of the at least two assets is a fixed point of interest.

* * * * *